March 15, 1932. F. E. CHAPPER 1,849,450
PORTABLE OVEN
Filed April 18, 1930

INVENTOR.
FRANK E. CHAPPER
BY
ATTORNEY.

Patented Mar. 15, 1932

1,849,450

UNITED STATES PATENT OFFICE

FRANK E. CHAPPER, OF DETROIT, MICHIGAN

PORTABLE OVEN

Application filed April 18, 1930. Serial No. 445,498.

This invention relates to portable ovens, and an object of the device is to provide an oven of this character which is light in weight and which may be quickly and easily placed over an open flame. It is often undesirable and inconvenient to use the large oven that is an integral part of the ordinary gas or electric range particularly where a small amount of food is desired to be cooked, for instance in the baking of a single potato. It will thus be seen that in a device of this character, which is of comparatively small size, the same may be placed over a single burner in a gas or electric stove and accomplish the same results as would be attained by using the main oven of the stove.

Another object of the device is to provide a small portable oven consisting of a hollow box like member provided with apertures near its upper edge for the admission of heat and an outside wall in spaced relation to the same and formed integral therewith to permit the heat generated to be evenly distributed around the outer area of the box like structure.

These objects and the several novel features of the invention are hereinafter more fully described and claimed, and the preferred form of construction by which these objects are attained is shown in the accompanying drawings in which—

Figure 1:
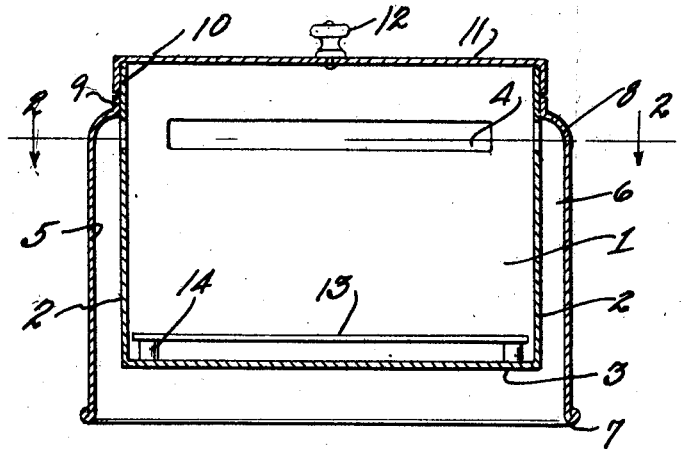
Fig. 1 is a vertical sectional view through my improved form of oven.
Figure 2:
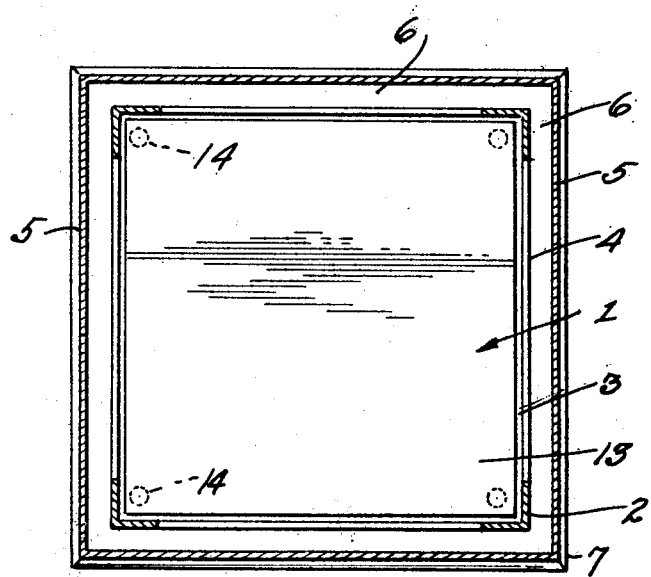
Fig. 2 is a horizontal transverse sectional view taken on line 2—2 of Fig. 1.

Referring now to the drawings wherein like reference characters designate like parts throughout the several views, my device comprises the chamber 1 formed by the vertical walls 2 and the base 3. The walls 2 near the upper edge thereof are provided with the apertures 4. As will be seen by reference to the drawings, the outer walls 5 are spaced from the walls 2 forming the space 6 therebetween. As will be more clearly seen in Fig. 1, the walls 5 extend below the base 3 of the oven proper and are formed with the rolled edge 7 to form a finished surface. The upper edges of the walls 5 are curved inwardly as indicated at 8 and are formed with the upstanding flanges 9 which closely encircle the walls 2. The flanges 9 may then be spot-welded to the walls 2 thus forming an integral unit of the walls 5 and the walls 2.

It will be noted that the inturned portions 8 abut the walls 2 slightly above the apertures 4 formed in the said walls thus causing the heat that passes up in the space 6 to be deflected into the aperture 4 and down on top of the food that is being cooked in the oven. It will also be seen from Fig. 1 that the walls 2 extend upwardly above the flange 9 as indicated at 10 and a tight fitting cover 11 provided with a handle 12 is adapted to closely encircle the upstanding flange 10 to prevent heat that enters the chamber 1 from escaping from the top.

If desired, a plate 13 having the legs 14 secured to the lower face thereof may be placed within the chamber 1 and rest upon the base 3 to prevent food in the chamber 1 from burning.

When it is desired to use the oven, food that is to be cooked is placed within the chamber 1 and the oven then placed over a source of heat such as a burner of a gas stove. Heat from the burner will be distributed around the walls 2 and through the apertures 4 onto the top of the food thus causing an even cooking of the food in the chamber 1.

From the foregoing description it becomes evident that I have provided a portable oven that is cheap to manufacture and which will attain the same results as those obtained by the use of the ordinary oven formed integral with a range and further that the heat applied thereto will be evenly distributed around the oven and onto the food thus causing an even cooking of the same.

Having thus fully described my invention, its utility and mode of operation, what I claim and desire to secure by Letters Patent of the United States is—

1. A device of the character described comprising a hollow box like member provided near its upper edge with apertures, a sheet metal wall surrounding the box like member and in spaced relation thereto, the upper edge of said wall bent in to contact the box like structure entirely around the same and above the apertures therein and the lower edge of said wall extending below the floor of the box like structure, and the upper edge of the box like structure extending above the meeting line of the outer wall and the sides of the box like member to form a shoulder for receiving a cover.

2. A device of the character described comprising a hollow rectangular box like member provided near its upper edge with apertures a metal wall entirely surrounding the box like member in spaced parallel relation thereto, the upper edge of said wall bent in to contact the box like structure above the apertures therein, the lower edge of the wall extending below the hollow box like member providing the sole support for the hollow box.

In testimony whereof I sign this specification.

FRANK E. CHAPPER.